Jan. 3, 1956  F. R. GRUNER  2,729,332
VIBRATORY SCREEN MOUNTING
Original Filed Aug. 13, 1947  2 Sheets-Sheet 1

Inventor
Frederick R. Gruner
by Wayne B. Easton
Attorney

Jan. 3, 1956 F. R. GRUNER 2,729,332
VIBRATORY SCREEN MOUNTING
Original Filed Aug. 13, 1947 2 Sheets-Sheet 2

Inventor
Frederick R. Gruner
by William S. Gale
Attorney

United States Patent Office 2,729,332
Patented Jan. 3, 1956

2,729,332

VIBRATORY SCREEN MOUNTING

Frederick R. Gruner, West Allis, Wis., assignor to Allis-Chalmers Manufacturing Company, Milwaukee, Wis., a corporation of Delaware Application April 5, 1951, Serial No. 219,399

2 Claims. (Cl. 209—329)

The present invention is concerned with an improved mounting for isolating vibratory devices from their supporting structures. This application is a continuation of my pending application Serial No. 768,310, filed August 13, 1947 and now abandoned.

More particularly, the invention concerns floor mountings for vibratory devices of the type shown in C. S. Lincoln et al., Patent No. 2,144,382, that is, of the type which are vibrated by a mechanism for exerting forces in a straight line through the center of gravity of the device, in a vertical plane.

Cable suspension such as is shown in the Lincoln patent has been successfully employed in the past, but a floor mounting would be highly desirable in many cases to eliminate the necessity of providing the overhead support required for suspending the cable. Many types of floor mounting arrangements for screens of this type have been devised, but difficulties have been encountered in practice. Many mounting arrangements have been complicated and expensive, unsatisfactory in operation, or not sufficiently durable or reliable to give good service in the field.

The principal advantage of the novel mounting arrangement of the present invention is realized primarily during starting and stopping of the vibratory device, that is, during the period when a mechanism for exerting forces in a straight line through the center of gravity of the vibratory device is accelerated from no speed to normal operating speed and when decelerated from normal operating speed to no speed.

An object of the present invention is to provide a new and improved resilient mounting arrangement of simple, durable construction, cooperating by reason of its structural features with the specific features of the vibrating mechanism to provide for efficent operation.

Another object concerns provision of a resilient mounting arrangement which will permit vibrations of large predetermined amplitudes in the desired direction with relation to the specific vibrating mechanism while maintaining the necessary stability and properly isolating the vibrating mechanism from the supporting structure.

Another object of the invention concerns the provision of a mounting arrangement involving resilient elements arranged to accommodate vibratory movement by deflection in shear planes parallel with the line in which the vibrating forces are applied to the vibrating body by the actuating mechanism, while supporting the weight of the body at least partly by compression.

Another feature of the invention concerns the provision for adjustable initial compression of the resilient shear mounting elements in a direction transverse to the shear deflection planes. Other features of the invention reside in the construction and arrangement of the apparatus described hereinbelow with reference to the accompanying drawings, in which.

Figure 1:
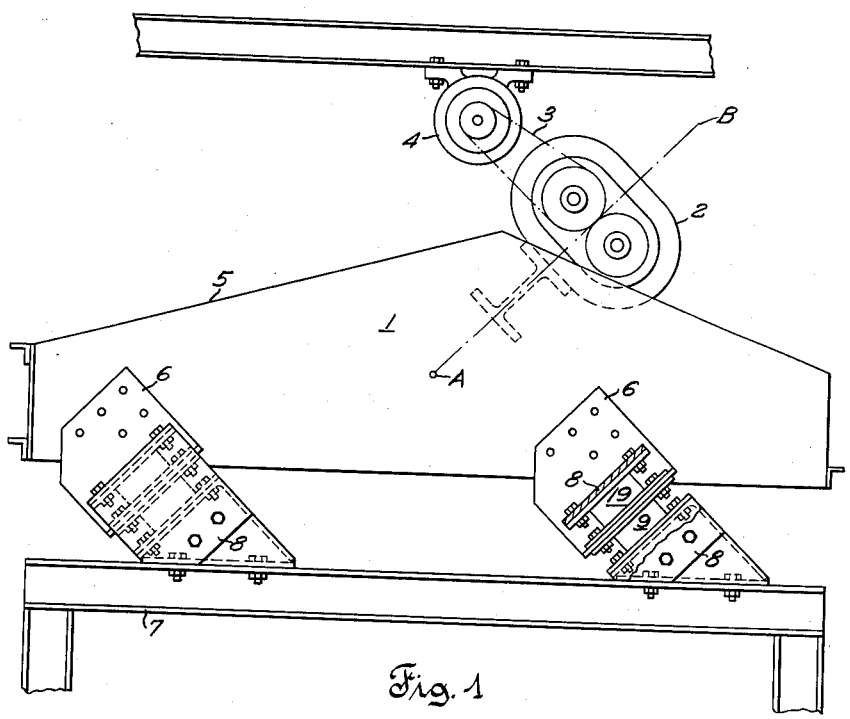
Fig. 1 is a side view of a screen mounting arrangement according to the present invention.

In the embodiment of the invention illustrated and described in the drawing, a vibratable screen body 1 is provided with a suitable power driven vibrating mechanism 2 rigidly attached to body 1 for free vibration therewith, substantially as described in Lincoln Patent 2,144,382. The mechanism 2 is arranged to be driven by a belt drive 3 from a driving motor 4 as described in the Lincoln patent. The mechanism 2 may of course be any other suitable known mechanism mounted on the body 1 and driven by suitable known driving means to generate periodic inertia force impulses in line with the center of gravity A of screen body 1 and mechanism 2, which force impulses tend to move the body and mechanism in a straight line path, of direction indicated by line A—B.

In order to provide for movement of the body 1 with relation to its stationary base, suitable resilient mountings are provided as described hereinbelow.

The spaced parallel side plates 5 of body 1 are provided at spaced points with laterally projecting mounting flanges 6, or other suitable flat surface forming portions, having flat surfaces 6' and 6" parallel to a common reference plane through line A—B perpendicular to the side plates 5.

Figure 2:
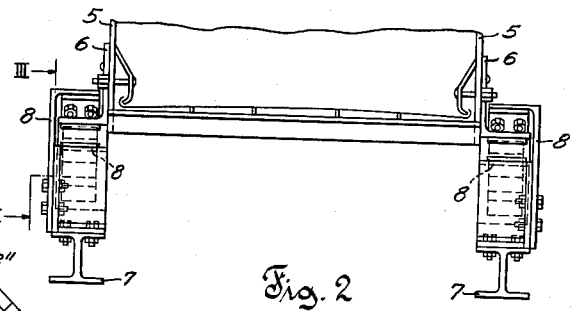
Fig. 2 is an end view of the structure shown in Fig. 1.
Figure 3:
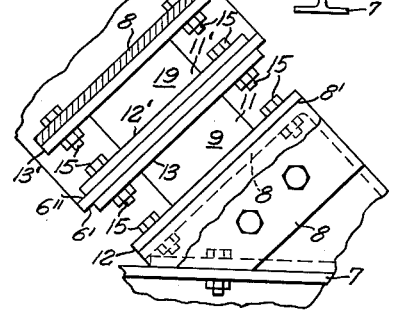
Fig. 3 is a fragmentary side view to an enlarged scale of the mounting arrangement shown in Figs. 1 and 2, viewed from the plane indicated by line III—III of Fig. 2.
Figure 4:
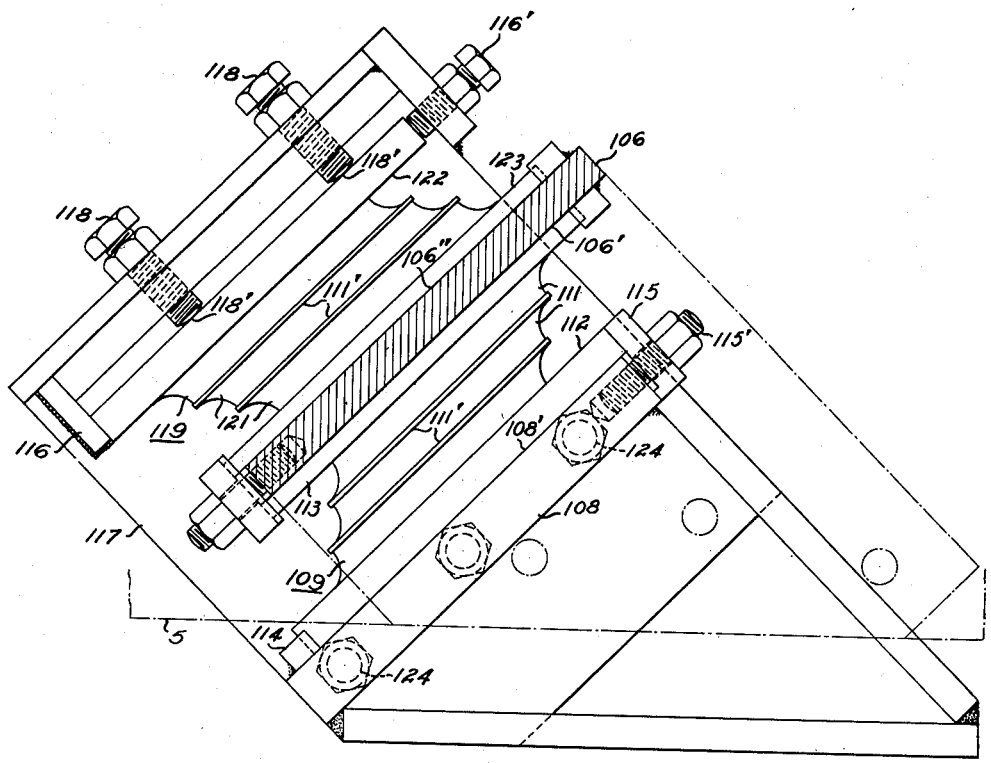
Fig. 4 is a fragmentary side view to an enlarged scale of a modified form of the mounting arrangement shown in Figs. 1 to 3.

The floor or base frame 7 is provided, at points spaced to correspond with the points at which surfaces 6' and 6" on the body 1 are located, with plates, brackets, pads, pedestals, or other suitable means 8 having flat mounting surfaces 8' facing upwardly, and flat mounting surfaces 8" facing downwardly, each such surface being parallel to a common reference plane inclined to the horizontal at an angle equivalent to that desired to be established between the path A—B of vibratory movement of body 1 and the horizontal. Respectively between each of the surfaces 6' and 8' and between each of the surfaces 6" and 8" are secured, as by bolts 15, a corresponding plurality of universally deflectable, resilient mounting elements 9 and 19, each respectively comprising a column or body 11 and 11' of elastically deformable rubber like composition, that is, vulcanized rubber or other suitable elastically deformable material having the physical characteristics of vulcanized rubber, such as any of the many known synthetic rubbers and other rubber substitutes now in use. Each of the bodies of rubber 11 and 11' may take the form of a solid block or column as shown in Figs. 1 to 3, or may be divided parallel to its base by rigid metal plate inserts 111' vulcanized in the body of the composition, as shown in Fig. 4; and the rubber body 11 may be vulcanized or bonded to flat surfaces of a pair of attaching plates 12 and 13 and the rubber body 11' may be attached in a similar manner to plates 12' and 13'. The attaching plates 12 and 13 will, in normal unstressed condition of the elastic resilient body 11, be held in spaced parallel relation by the connecting body of rubber. This form of mounting element, as shown in the drawing, will be termed, for convenience, an "interplane shear mounting"; and this term will be employed in this specification, and in the appended claims, with the following special definition: a body of elastically deformable material (rubber or the like) secured on opposite parallel faces to plane surfaces of a pair of relatively movable rigid elements, and so unrestrained laterally, intermediate said plane surfaces, as to be deflectable in shear by opposite motion of said relatively movable elements in directions having a component in the plane of said surfaces.

It will be seen that each mounting, comprising mounting elements 9 and 19, will (if properly spaced with relation to the center of gravity A of the supported mass in accordance with known principles) contribute to the support of body 1 and mechanism 2 such that line A—B and surfaces 6' and 6" will be parallel to the common reference plane of parallelism of surfaces 8' and 8". The weight of body 1 and mechanism 2 will deflect the bodies 11 and 11' of mountings 9 and 19 such that the weight of the body and mechanism is balanced by shear stresses in each of the deformed rubber bodies 11 and 11'.

Operation of mechanism 2 will cause free vibration of body 1 in a straight line path A—B parallel with surfaces 8' and 8", and the rubber bodies 11 and 11' will support the load without transmitting any substantial vibrating forces to the base. Since the force required to deflect the mountings 9 and 19 a given amount by straight compression or tension will be greater than that required to deform the mountings in shear by the same amount, this form of mounting arrangement is ideally suited to use with a driving motor and belt drive arranged at 90° to the path of motion A—B, because the variations in belt tension occurring during operation will cause very little deflection in directions perpendicular to the shear planes of the mountings.

The mounting arrangement shown in Figs. 1 and 2 can of course be constructed within the scope of the invention by reversing certain of the parts. Such a reversal of parts would merely involve providing side plates 5 with brackets or other suitable means each having two parallel opposed surfaces and providing floor brackets or other means each having but one plate spaced intermedate the two parallel opposed surfaces on each of the side plate brackets. Suitable mounting elements identical to elements 9 and 19 could be respectively interposed between the two parallel surfaces of each of the side plate brackets and both sides of the intermediate plate of each of the floor brackets.

The mode of operation of the present invention during acceleration and deceleration of the vibratory force exerting mechanism 2 may be illustrated by first understanding that a body free in space, such as a vibratable screen body 1, unless restrained in certain directions, has six degrees of freedom: (1) it can bob up and down, (2) move forward and backward, (3) sway sideways, and the rotational freedoms known under the technical names of (4) pitching about a lateral axis, (5) rolling about a longitudinal axis, and (6) yawing or nosing about a vertical axis. In a single body each of the six degrees of freedom corresponds to a different natural frequency such that a condition of resonance occurs six distinct times at six different critical speeds as the vibratory mechanism increases its speed from zero to the normal operating speed. This phenomenon can be observed in a variety of resiliently mounted vibrating devices by noting the violent "bouncing" or irregular movement the vibratable body is subjected to during starting and stopping of the vibrating mechanism. The term "bouncing" as used herein describes the violent irregular movement of an unrestrained resiliently mounted screen body as the vibrating mechanism goes through the six critical speeds corresponding to the six natural frequencies referred to above.

In the past when it was desired to utilize rubber for resiliently supporting a screen body and a large predetermined amplitude of the screen body was required, on the order of one-half inch for example, the rubber portions of the mountings were severly stressed in tension due to the "bouncing" of the screen body during the starting and stopping intervals. Where the body to be vibrated was massive and heavy, as a screen body usually is, such mountings were subject to premature failure and required frequent replacement.

The mounting arrangement of the present invention avoids the destructive effects of the plurality of resonant conditions, or "bouncing," referred to above, by restraining the motion of the screen body in certain directions. The most important of these resonant conditions are those that (1) tend to cause the screen body to bob up and down and those that (4) tend to cause pitching about a lateral axis. An analysis of the present mounting arrangement under such conditions, during starting and stopping of the vabrating mechanism 2, is as follows:

(1) Bobbing up and down of screen body (perpendicular to line A—B). On the "up" part of the cycle the rubber pads 11' of mountings 19 are in compression and thereby effectively prevent tension in the rubber pads 11 of mountings 9. On the "down" part of the cycle the rubber pad 11 in each mounting 9 is in compression thereby effectively preventing tension in the rubber pads of mounting 19.

(4) Pitching about a lateral axis (axis laterally perpendicular to line A—B). The natural frequency of the vibratory body or screen for this type of motion is known as the torsional rocking frequency. As the name implies, the vibratory body tends to "rock" when the vibrating mechanism passes through the critical speed corresponding to the rocking frequency. The mounting arrangement of the present invention is particularly effective in preventing this type of motion and thereby completely avoids tension in any of the rubber pads; the reason is that the rubber pads of the mountings 19 of the end of the screen body that tends to rise and the rubber pads of the mounting 9 of the end of the screen body that tends to drop are compressed in opposite directions with respect to base frame 7.

In order to take full advantage of the basic features of the form of the mounting arrangement shown in Figs. 1 to 3, a modified form of mounting arrangement has been devised which is illustrated in Fig. 4. Since the arrangement of the mountings with relation to the screen body and vibrating mechanism is fully illustrated in Figs. 1 to 3, Fig. 4 shows only detail views of a single mounting.

The reference characters 108 and 108' correspond to 8 and 8' of Fig. 1. 106 and 106' correspond to 6 and 6' of Fig. 1. In order to provide a mounting which is more readily assemblable and disassemblable, a base plate 108 is provided with an abutment 114 bordering one edge. A movable abutment or clamping plate 115 with an actuating screw 115' borders an opposite edge of the plate 108. Inter-plane shear mounting element 109 is secured to plate 108 by clamping an attaching plate 112 between the fixed abutment 114 and the movable abutment 115. In this arrangement it will be seen that attachment and detachment of the mounting element 109 with relation to plate 108 requires only the loosening and tightening of the attaching bolt 115'. The free end of mounting element 109, that is, its attaching plate 113 is secured to flange 106 and the side plate 5 of vibrated body 1 by any suitable known arrangement, shown as a clamping device very similar to fixed and movable abutments 115 and 114.

In the modified mounting of Fig. 4, it will be seen that additional resilient mounting elements 119 having rubber bodies 121, are attached at their free or movable ends by attaching plate 123 to the upper surface 106" of flange 106. The opposite face of the mounting element 119, that is, attaching plate 122, is clamped between an abutment 116 and a clamping screw 116' which are mounted on a rigid flanged plate 117. Flanged plate 117 is secured to and extends from plate 108 in flanking relation to mounting element 109, flange 106 and mounting element 119 and has its flange in overhanging, parallel, opposed, spaced relation to surface 108' of base plate 108. This rigid flanged plate 117, of L-shaped cross section, provides a rigid stationary mounting for threaded screws 118 the ends of which, projecting through the flange of flanged plate 117, determine a mounting surface 118'. It will be seen that rotation of the screws 118 will advance and retract the surface 118' determined by their ends, and which determines the position of attaching plate 122 of mounting element 119, and that advancing the screws 118 in the direction of surface 108' will place the mounting elements 119 and 109 under compression. Screws 118 in threaded relation to flanged plate 117 as shown constitute an adjustable clamping device.

In order to preserve the utmost in durability of rubber mounting elements of the character shown in the drawing, it is desirable to have the stress vary between two values having the same algebraic signs rather than having the stress change in nature, as from compressive to tensile. Therefore, the modified mounting will, in use, be placed under compression by advancing the screws 118 toward plate 108 sufficiently so the rubber bodies 121 and 111 of mounting elements 119 and 109 will both be under compressive stresses when the body 1 is supported in stable equilibrium, and the characteristics of the mounting elements will be so chosen that the deflection in shear of the elastically deformable material, caused by the full operative vibrational amplitude of the body 1 will not cause any substantial tensile stress in any part of the bodies 111 or 121. Any extraneous motion of the screen body 1 in a direction perpendicular to its designed path of motion will be effectively resisted by the opposed mounting elements 109 and 119.

The flanged plate 117 is detachably secured to an edge of plate 108, as by bolts 124. Therefore, it will be seen that the inter-plane shear mounting elements 109 and 119 may be readily exposed for inspection or replacement by removing the bolts 124 and loosening screws 116' and 118. Flanged plate 117 and plate 108 may be considered as together constituting a means forming a pair of opposed, spaced, parallel, mounting surfaces 108' and 118', between which the mounting flange 106 of the screen body 1 extends, and with which it is connected by a pair of inter-plane shear mounting elements 109 and 119.

It will be noted that the mounting element 109 constitutes a column of resilient material 111 attached at its base to a fixed plate 108 and extending therefrom along an axis in a vertical plane perpendicular to surface 108'. The axis of the column of rubber material 111 is inclined toward the vertical with reference to a line normal to the mounting surface 108'. Thus, the weight of the body 1 and mechanism 2, acting vertically downward on the free end of column of rubber 111 will act to place the entire column 111 under compression and shear stresses so as to avoid any appreciable tensioning of the rubber body. The column of rubber material 121 of mounting 119 has its base fixed with relation to the stationary base and extends along an axis in the same vertical plane as that of the column of rubber material 111 inclining in the direction of the horizontal, and intersecting the axis of the column of rubber material 111 at a point approximately midway between surfaces 118' and 108'. Flanges 106, and the body 1 to which they are attached are therefore yieldingly supported between the inter-plane shear mounting elements 109 and 119, which tend to stabilize the body for motion in a plane containing line A—B and a horizontal line intersecting same. The angular relationship of the axis of rubber columns 111 and 121 establishes a construction in which the dead load or dead weight of screen body 1, mechanism 2 and any working load supported by body 1, tends to deflect columns 111 and 121 in such a way that column 121, as well as 111, will be stressed in compression normally to surfaces 106'' and 118' as a result of shear deflection of both columns 111 and 121 downwardly parallel to the surface 108'.

While specific mechanism embodying the invention has been described and illustrated hereinabove, it will be understood that the invention is not limited to the specific details of the particular embodiments described and illustrated, but includes such modifications and equivalents as may readily occur to those persons skilled in the art to which it appertains, within the scope of the appended claims.

It is claimed and desired to secure by Letters Patent:

1. A vibrating screen of the type in which a resiliently mounted screen body is caused during normal operation to have a vibratory motion along a straight line in a plane inclined to the horizontal and in which large undesired forces produced at resonant speeds during the starting and stopping operations tend to vibrate the screen body in a generally vertical direction, comprising, a screen body, power driven means for imparting period inertia forces to said screen body along a straight line inclined to the horizontal, a plurality of rigid plates attached to said screen body having upwardly and downwardly facing surfaces arranged in parallel relation to said plane and said straight line, a stationary base member, mounting means on said base member having upwardly facing mounting surfaces respectively arranged beneath said downwardly facing surfaces of said plates in parallel relation thereto and downwardly facing mounting surfaces respectively arranged above said upwardly facing surfaces of said plates in parallel relation thereto, a first group of elastically deformable interplane shear mountings respectively connecting said upwardly facing mounting surfaces and said plates which yield resiliently in compression to support the load of said screen body and which yield resiliently in shear to resist the motion imparted to said screen body along said straight line, and a second group of elastically deformable interplane shear mountings respectively connecting said downwardly facing surfaces and said plates which yield resiliently in shear to resist the motion imparted to said screen body along said straight line during normal operation of the vibrating screen and which yield resiliently in compression to resist the vertical motion of the screen body caused by large undesired vertical forces produced at resonant speeds during starting and stopping of the vibrating screen and thereby prevents said large vertical forces from excessively stressing said first group of mountings in tension.

2. A vibrating screen of the type in which a resiliently mounted screen body member is caused during normal operation to have a vibratory motion along a straight line in a plane inclined to the horizontal and in which large undesired forces produced at resonant speeds during the starting and stopping operations tend to vibrate the screen body member in a generally vertical direction, comprising, a screen body member, power driven means for imparting period inertia forces to said screen body member along a straight line inclined to the horizontal, a stationary base member, a plurality of rigid plates attached to one of said members and arranged in parallel relation to said plane and said straight line, mounting means attached to the other of said members having upwardly facing mounting surfaces respectively arranged beneath said plates in parallel relation thereto and downwardly facing mounting surfaces respectively arranged above said plates in parallel relation thereto, a first group of elastically deformable interplane shear mountings respectively connecting said upwardly facing mounting surfaces and said plates which yield resiliently in shear to resist the motion imparted to said screen body along said straight line, and a second group of elastically deformable interplane shear mountings respectively connecting said downwardly facing surfaces and said plates which yield resiliently in shear to resist the motion imparted to said screen body along said straight line, the mountings of one of said groups being stressed in compression to resist the vertical motion of the screen body member caused by large undesired vertical forces produced at resonant speeds during starting and stopping of the vibrating screen.

References Cited in the file of this patent

UNITED STATES PATENTS

| | | |
|---|---|---|
| 1,822,507 | Schmidt | Sept. 8, 1931 |
| 2,032,082 | Deister | Feb. 15, 1936 |
| 2,043,725 | Anderson | June 9, 1936 |
| 2,071,373 | Wurzbach et al. | Feb. 23, 1937 |
| 2,099,031 | Neal et al. | Nov. 16, 1937 |
| 2,222,299 | Parks | Nov. 19, 1940 |
| 2,260,029 | Hull | Oct. 21, 1941 |
| 2,284,692 | Strube | June 2, 1942 |
| 2,312,477 | Pollitz | Mar. 2, 1943 |
| 2,328,614 | Busse | Sept. 7, 1943 |
| 2,355,829 | Tyler | Aug. 15, 1944 |

OTHER REFERENCES

Mechanical Engr. May 1937, pages 345–349.